United States Patent
Shiota et al.

(10) Patent No.: US 7,697,039 B2
(45) Date of Patent: Apr. 13, 2010

(54) IMAGE TRANSMITTING SYSTEM, AN IMAGE TRANSMITTING METHOD, AND A MACHINE READABLE MEDIUM STORING THEREON A COMPUTER PROGRAM FOR TRANSMITTING IMAGES

(75) Inventors: Kazuo Shiota, Tokyo (JP); Shuichi Ohtsuka, Kanagawa (JP); Kazuki Nakajima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 766 days.

(21) Appl. No.: 11/187,935

(22) Filed: Jul. 25, 2005

(65) Prior Publication Data

US 2006/0055825 A1    Mar. 16, 2006

(30) Foreign Application Priority Data

Sep. 10, 2004    (JP) ............................. 2004-264528

(51) Int. Cl.
*H04N 5/76* (2006.01)
*G06K 9/00* (2006.01)

(52) U.S. Cl. .............. 348/231.2; 348/231.3; 348/231.5; 382/117

(58) Field of Classification Search . 348/231.99–231.9, 348/563, 231.3, 231.2; 725/135; 382/181, 382/117, 118, 305, 115; 707/200; 386/1, 386/45, 46, 125, 126
See application file for complete search history.

(56) References Cited

U.S. PATENT DOCUMENTS

| | | | | |
|---|---|---|---|---|
| 5,850,470 A | * | 12/1998 | Kung et al. ................. | 382/157 |
| 6,038,333 A | * | 3/2000 | Wang ........................ | 382/118 |
| 6,963,672 B1 | * | 11/2005 | Watanabe et al. ........... | 382/305 |
| 7,477,805 B2 | * | 1/2009 | Ohtsuka et al. ............. | 382/305 |
| 2002/0008622 A1 | * | 1/2002 | Weston et al. ............. | 340/572.1 |
| 2002/0103813 A1 | * | 8/2002 | Frigon ..................... | 707/104.1 |
| 2006/0204143 A1 | * | 9/2006 | Shiota et al. ................ | 382/305 |

FOREIGN PATENT DOCUMENTS

JP    2002-218436 A    8/2002

* cited by examiner

*Primary Examiner*—Tuan Ho
*Assistant Examiner*—Marly Camargo
(74) *Attorney, Agent, or Firm*—Birch, Stewart, Kolasch & Birch, LLP (57) ABSTRACT

An image transmitting system is provided, wherein the system includes: a first image storing module storing a plurality of images included in a first electronic album; a second image storing module storing a plurality of images included in a second electronic album; a feature extracting module for extracting a feature amount of an object included in each of the plurality of images stored in the second image storing module; an image selecting module for selecting an image including an object showing correspondence with the object included in the image stored in the second image storing module, which is higher than a predetermined reference value, out of the plurality of images stored in the first image storing module on the basis of the extracted feature amount; and an image transmitting module for retrieving the selected image from the first image storing module and storing the image in the second image storing module to transmit the image from the first image storing module to the image storing module.

11 Claims, 9 Drawing Sheets

| IMAGE IDENTIFIER | IMAGE DATA |
|---|---|
| 0 |  |
| 1 |  |
| 2 |  |
| ... | ... |

FIG. 3

| IMAGE IDENTIFIER | FEATURE AMOUNT OF EVERY OBJECT |
|---|---|
| 0 | A |
|  | B |
|  | ⋮ |
| 1 | C |
|  | D |
|  | ⋮ |
| ⋮ | ⋮ |

| PERSON IDENTIFIER | FACE IMAGE |
| --- | --- |
| 0 |  |
| 1 |  |
| 2 |  |
| ... | ... |

FIG. 5

| IMAGE IDENTIFIER | IMAGE DATA | PERSON IDENTIFIER |
|---|---|---|
| 0 |  | 0, 1 |
| 1 |  | 2, 3, 4 |
| 2 |  | 0, 3 |
| ⋮ | ⋮ | ⋮ |

FIG. 6

| PERSON ① | PERSON ② | INTIMACY |
|---|---|---|
| 0 | 1 | 10 |
| | 2 | 5 |
| | ⋮ | ⋮ |
| 1 | 2 | 3 |
| | 3 | 7 |
| | ⋮ | ⋮ |
| ⋮ | ⋮ | ⋮ |

IMAGE TRANSMITTING SYSTEM, AN IMAGE TRANSMITTING METHOD, AND A MACHINE READABLE MEDIUM STORING THEREON A COMPUTER PROGRAM FOR TRANSMITTING IMAGES

The present application claims priority from a Japanese Patent Application No. 2004-264528 filed on Sep. 10, 2004, the contents of which are incorporated herein by reference.

BACKGROUND OF THE INVENTION

1. Field of the Invention

The present invention relates to an image transmitting system, an image transmitting method, and a machine readable medium storing thereon a computer program for transmitting images.

2. Description of the Related Art

Conventionally, an image acquiring method for acquiring images which have been stored in another apparatus via network to store them in an image management apparatus of a user is known as disclosed, for example, in Japanese Patent Application Laid-Open No. 2002-218436.

In this image acquiring method, it is possible for the user to acquire images the user wants by sending information showing an object of images which the user wants to acquire to another apparatus via network.

However, since the image acquiring method described in Japanese Patent Application Laid-Open No. 2002-218436 requires sending information showing an object of which image has been captured whenever the image is acquired, there is a problem that it is difficult to acquire images of various objects and a large number of images efficiently.

Further, an image acquiring method where a thumb-nail image of each of a plurality of images stored in another apparatus is received via network and a user browses the thumb-nail images to select an image which he wants to acquire also has a problem that working intensity for selecting an image which the user wants to acquire grows as the number of images stored in another apparatus and thus it is difficult to acquire the image efficiently.

SUMMARY OF THE INVENTION

Therefore, it is an object of the present invention to provide an image transmitting system, an image transmitting method, and a machine readable medium storing thereon a computer program for transmitting images, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image transmitting system includes: a first image storing module storing a plurality of images included in a first electronic album; a second image storing module storing a plurality of images included in a second electronic album; a feature extracting module for extracting a feature amount of an object included in each of the plurality of images stored in the second image storing module; an image selecting module for selecting an image including an object showing correspondence with the object included in the image stored in the second image storing module, which is higher than a predetermined reference value, out of the plurality of images stored in the first image storing module on the basis of the feature amount extracted by the feature extracting module; and an image transmitting module for retrieving the image selected by the image selecting module from the first image storing module and storing the image in the second image storing module to transmit the image from the first image storing module to the image storing module.

An image including the owner of the second electronic album may have been stored in the second image storing module, and the image selecting module may select an image including the owner of the second electronic album out of the plurality of images stored in the first image storing module. An image including the owner of the first electronic album may have been stored in the first image storing module, and the image selecting module may select an image including both of the owners of the first and second electronic albums out of the plurality of images stored in the first image storing module. Out of kinds of objects included in each of the plurality of images stored in the second image storing module, the image selecting module may select an image including an object of a kind to which more objects belong out of the plurality of images stored in the first image storing module with higher probability. The image selecting module may determine the reference value for correspondence between an object included in an image stored in the first image storing module and an object included in an image stored in the second image storing module on the basis of the number of images stored in the first image storing module.

The image transmitting system may further include: a person recognizing module for recognizing a plurality of persons included in each of the plurality of images stored in the second image storing module; and an intimacy evaluating module for evaluating intimacy between persons included in at least a part of the plurality of images stored in the second image storing module on the basis of the recognition result of the person recognizing module, and an image including the owner of the second electronic album may have been in the second image storing module, and the image selecting module may select an image including a person showing correspondence with a person showing intimacy with the owner of the second electronic album higher than a predetermined reference value, the correspondence being higher than a predetermined reference value, out of the plurality of images stored in the first image storing module.

Further, according to the second aspect of the present invention, a first image storing module stores a plurality of images included in a first electronic album, and a second image storing module storing a plurality of images included in a second electronic album, and a method for transmitting images includes: a feature extracting step of extracting a feature amount of an object included in each of the plurality of images stored in the second image storing module; an image selecting step of selecting an image including an object showing correspondence with the object included in the image stored in the second image storing module, which is higher than a predetermined reference value, out of the plurality of images stored in the first image storing module on the basis of the feature amount extracted in the feature extracting step; and an image transmitting step of retrieving the image selected in the image selecting step from the first image storing module and storing the image in the second image storing module to transmit the image from the first image storing module to the image storing module.

Further, according to the third aspect of the present invention, a machine readable medium storing thereon a computer program for making a computer function as an image transmitting system is provided, wherein the computer includes: a first image storing module storing a plurality of images included in a first electronic album; a second image storing module storing a plurality of images included in a second electronic album; a feature extracting module for extracting a feature amount of an object included in each of the plurality of images stored in the second image storing module; an image selecting module for selecting an image including an object showing correspondence with the object included in the image stored in the second image storing module, which is higher than a predetermined reference value, out of the plurality of images stored in the first image storing module on the basis of the feature amount extracted by the feature extracting module; and an image transmitting module for retrieving the image selected by the image selecting module from the first image storing module and storing the image in the second image storing module to transmit the image from the first image storing module to the image storing module.

The summary of the invention does not necessarily describe all necessary features of the present invention. The present invention may also be a sub-combination of the features described above.

According to the present invention, in case transmitting images between electronic albums containing a plurality of images, it is possible to select and transmit an image which an owner of the destination electronic album wants to acquire, accurately and automatically.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
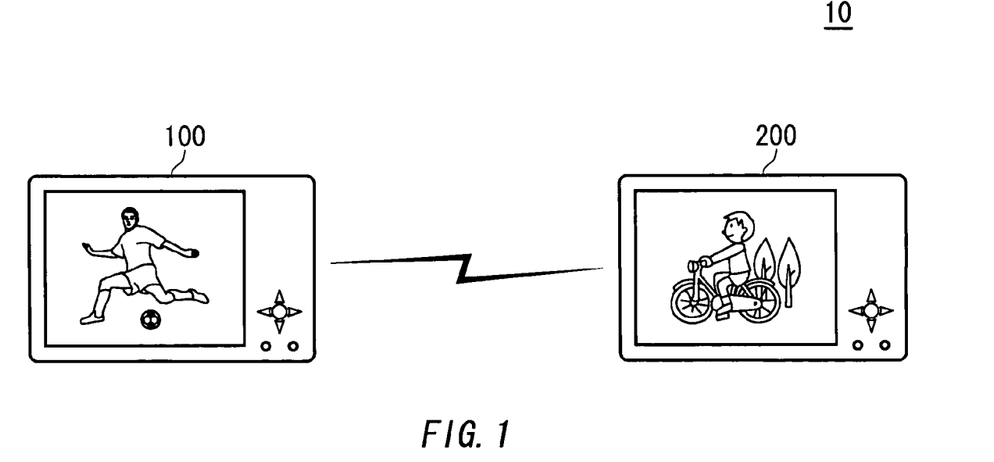
FIG. 1 shows an example of the exterior of an image transmitting system 10 according to an embodiment of the present invention.

FIG. 1 shows an example of the exterior of an image transmitting system 10 according to an embodiment of the present invention. The image transmitting system 10 includes a first image storing unit 100 for storing a plurality of images included in a first electronic album and a second image storing unit 200 for storing a plurality of images included in a second electronic album and transmits an image from the first image storing unit 100 to the second image storing unit 200. Further, the first and second image storing units 100 and 200 may transfer information such as image data by carrying out wireless communication, for example, by infrared ray communication, wireless LAN, Bluetooth (registered trademark), and the like, and wired communication, for example, by USB (registered trademark), Ethernet (registered trademark), and the like. Each of the first and second image storing units 100 and 200 may be a digital camera or a cellular phone with a digital camera, or a portable image display apparatus which has a display device such as a liquid crystal display and an operation means such as a button and which makes a user browse images stored therein by displaying the images on the display device. Further, each of the first and second image storing units 100 and 200 may be a personal computer connected with a network such as internet or an image reproducing apparatus such as a DVD player.

It is an object of the image transmitting system 10 according to the embodiment of the present invention, in case an owner of the second electronic album wishes to take an image included in the first electronic album in the second electronic album, to select an image which the owner of the second electronic album wants to acquire out of a plurality of images included in the first electronic album accurately and automatically and transmit the selected image to the second electronic album.

Figure 2:
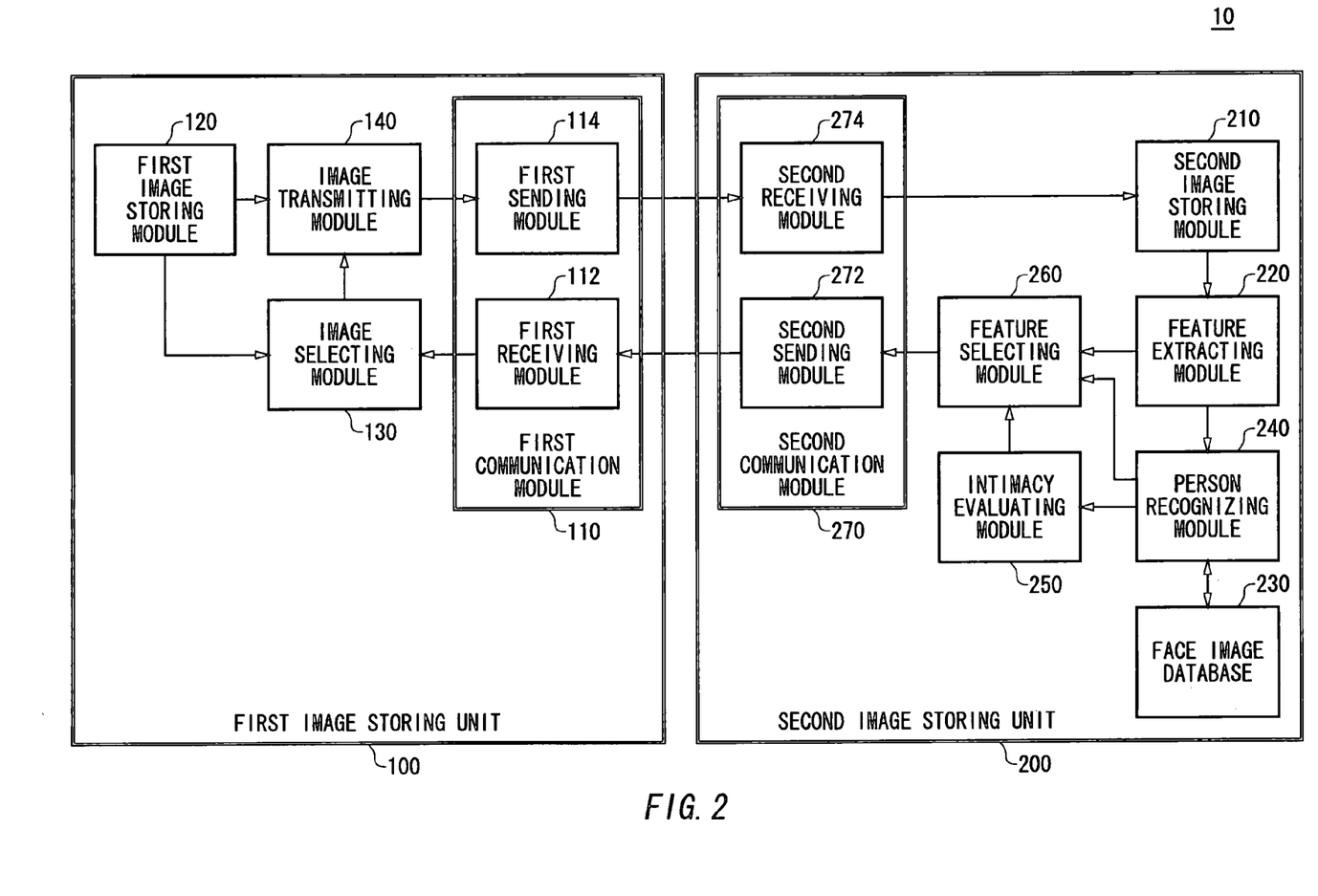
FIG. 2 is a block diagram showing an example of a functional configuration of the image transmitting system 10 according to the embodiment of the present embodiment.

FIG. 2 is a block diagram showing an example of a functional configuration of the image transmitting system 10 according to an embodiment of the present embodiment. The second image storing unit 200 includes a second image storing module 210, a feature extracting module 220, a face image database 230, a person recognizing module 240, an intimacy evaluating module 250, a feature selecting module 260, and a second communication module 270. The second image storing module 210 stores a plurality of images included in the second electronic album. The feature extracting module 220 extracts a feature amount showing a feature of an object included in each of the plurality of images stored in the second image storing module 210. Then, the feature extracting module 220 outputs the feature amount of the extracted feature to the person recognizing module 240 and the feature selecting module 260.

The face image database 230 stores face images of a plurality of persons. For each of the plurality of images stored in the second image storing module 210, the person recognizing module 240 recognizes a plurality of persons included in the image on the basis of the face images of the plurality of persons stored in the face image database 230. Here, the person recognizing module 240 may recognize a plurality of persons included in each image on the basis of a feature amount of an object included in the image extracted by the feature extracting module 220. Then, the person recognizing module 240 outputs the person recognition result for each image to the intimacy evaluating module 250 and the feature selecting module 260. The intimacy evaluating module 250 evaluates intimacy between each of persons included in at least a part of the plurality of images on the basis of the result of recognizing a plurality of persons included in each of the plurality of images stored in the second image storing module 210 by the person recognizing module 240. Then, the intimacy evaluating module 250 outputs the evaluated intimacy to the feature selecting module 260.

The feature selecting module 260 selects at least one part of the feature amounts of the objects extracted by the feature extracting module 220 from each of the plurality of images stored in the second image storing module 210. Here, the feature selecting module 260 may select feature amounts on the basis intimacy between each of the persons included in at least a part of the plurality of images stored in the second image storing module 210, which is evaluated by the intimacy evaluating module 250. Then, the feature selecting module 260 outputs the selected feature amount to the second communication module 270.

The second communication module 270 includes a second sending module 272 and a second receiving module 274 and carries out information communication with the first image storing unit 100. The second sending module 272 sends information to the first image storing unit 100. Specifically, the second sending module 272 sends the feature amount of an object included in an image included in the second image storing module 210, which is selected by the feature selecting module 260, to the first image storing unit 100. The second receiving module 274 receives information sent from the first image storing unit 100.

The first image storing unit 100 includes a first communication module 110, a first image storing module 120, an image selecting module 130, and an image transmitting module 140. The first communication module 110 includes a first receiving module 112 and a first sending module 114 and carries out information communication with the second image storing unit 200. The first receiving module 112 receives information sent from the second image storing unit 200. Specifically, the first receiving module 112 receives the feature amount of an object included in an image included in the second image storing module 210, which is selected by the feature selecting module 260, from the second sending module 272. Then, the first receiving module 112 outputs the received feature amount to the image selecting module 130. The first sending module 114 sends information to the second image storing unit 200.

The first image storing module 120 stores a plurality of images included in the first electronic album. The image selecting module 130 selects an image including an object showing correspondence with an object included in an image stored in the second image storing module 210, which is larger than a predetermined reference value, out of the plurality of images stored in the first image storing module 120. Specifically, on the basis of a feature amount of an object included in an image stored in the second image storing module 210 which is received from the first receiving module 112, extracted by the feature extracting module 220, and selected by the feature selecting module 260, the image selecting module 130 selects an image including an object with a feature amount showing correspondence with the feature amount, which is larger than a predetermined reference value. Then, the image selecting module 130 outputs information showing the selected image to the image sending module 140. The image sending module 140 retrieves the image selected by the image selecting module 130 from the first image storing module 120 and storing the image in the second image storing module 210 via the first sending module 114 and the second receiving module 274, and thus, transmits the image from the first image storing module 120 to the second image storing module 210.

According to the image transmitting system 10 of the embodiment of the present invention, it is possible to transmit an image including an object which is the same as an object included in an image stored in the second image storing module 210 from the first image storing module 120 to the second image storing module 210. Thus, it is possible for the owner of the second electronic album to take an image of an object in which the owner is interested in the second electronic album without browsing a plurality of images included in the first electronic album to search for the image. Further, by this, even in case the first electronic album includes an image which the owner of the first electronic album does not want to show to the owner of the second electronic album, such as a privacy of the owner of the first electronic album, the owner of the first electronic album can transmit an image which the owner of the second electronic album wants to acquire to the second electronic album without manually selecting the image which he/she does not want to show to the owner of the second electronic album. Furthermore, in this case, insofar as the image which the owner of the first electronic album does not want to show to the owner of the second electronic album and the image included in the second electronic album include no common object such as the same person, the image which the owner of the first electronic album does not want to show to the owner of the second electronic album is not shown to the owner of the second electronic album. Thus, it is possible to transmit the image which the owner of the second electronic album wants to acquire to the second electronic album while keeping privacy of the owner of the first electronic album.

Figure 3:
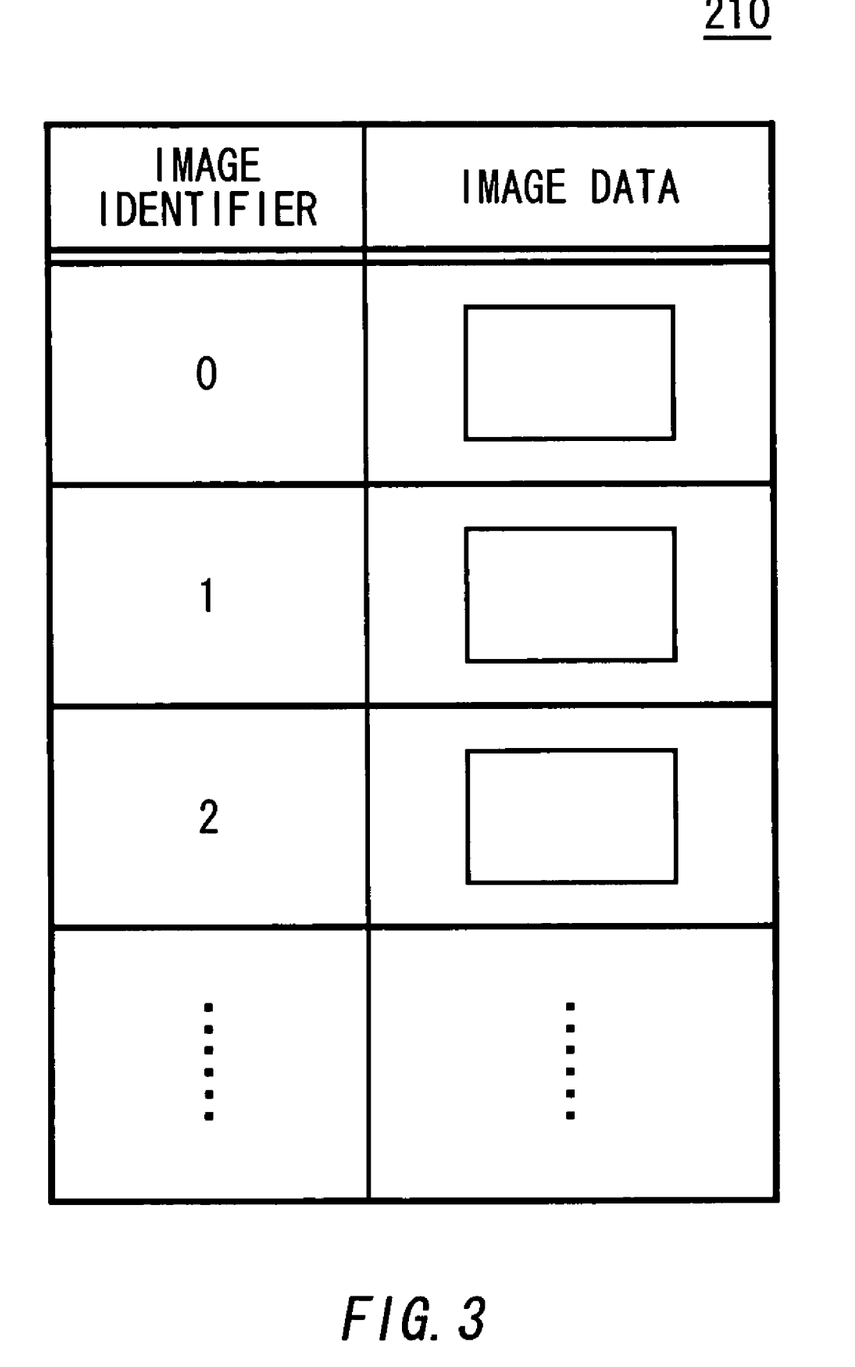
FIG. 3 shows an example of a second image storing module 210 according to the embodiment of the present invention.

FIG. 3 shows an example of the second image storing module 210 according to the embodiment of the present invention. For each of the plurality of images included in the second electronic album, the second image storing module 210 stores an image identifier for identifying the image and image data showing the image so that they correspond to each other. Here, the image identifier may be a value which is set to be unique for each image when the image is stored in the second image storing module 210. Further, although the image identifier is a number in the present example, it may be a string such as a file name assigned to a file showing image data. Further, similarly with the second image storing module 210, the first image storing module 120 may store an image identifier of each of the plurality of images included in the first electronic album so that it corresponds to image data of the image.

Figure 4:
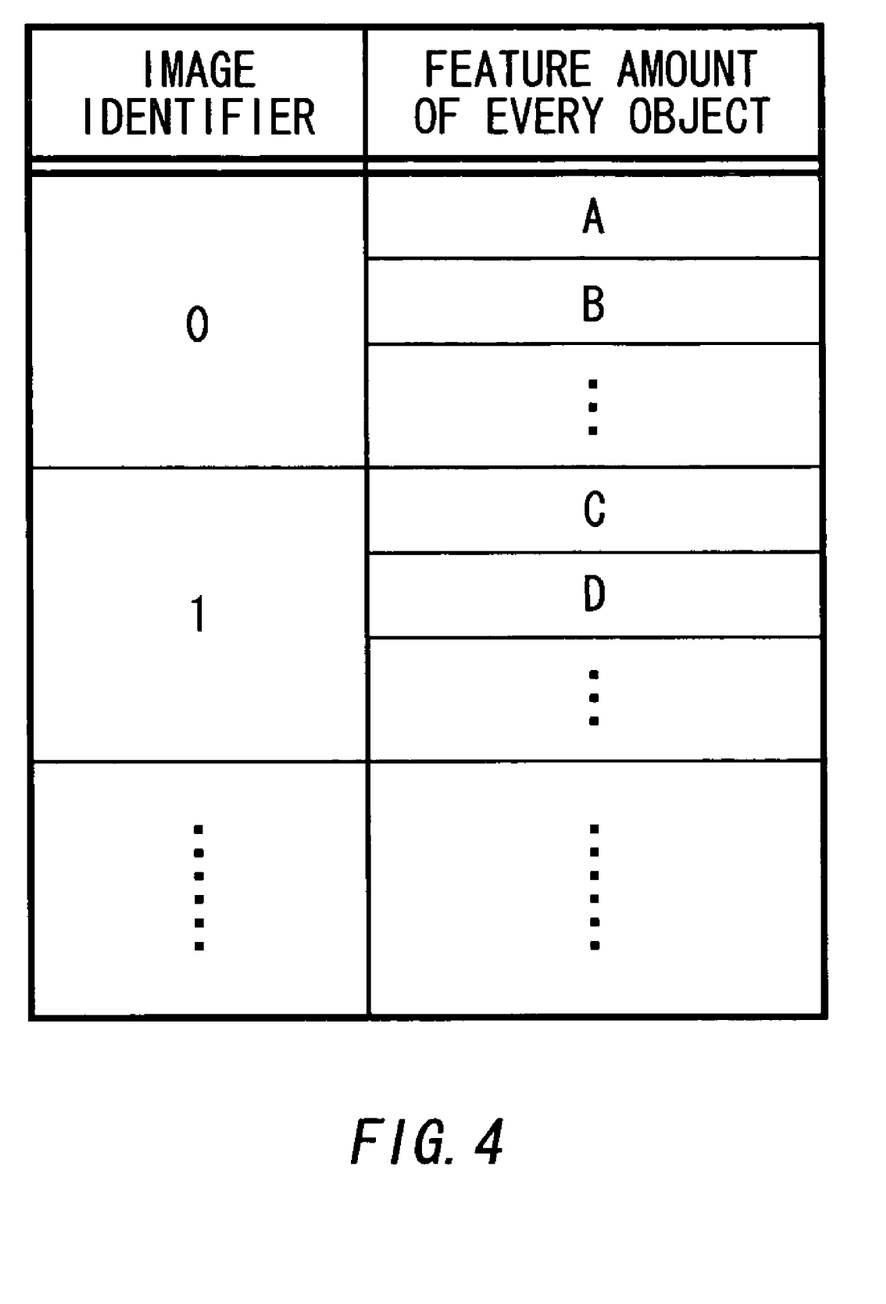
FIG. 4 shows an example of result of a feature extracting module 220 according to the embodiment of the present invention extracting feature amounts.

FIG. 4 shows an example of result of the feature extracting module 220 according to the embodiment of the present invention extracting feature amounts. For each of the plurality of images included in the second image storing module 210, the feature extracting module 220 extracts a feature amount of each of objects included in the image. For example, the feature extracting module 220 extracts feature amounts (A, B, . . . ) for every object from an image of which image identifier is 0. Specifically, for each of the plurality of images included in the second image storing module 210, the feature extracting module 220 detects a plurality of objects included in the image by performing known image-process such as contour-shape extracting process and color-distribution analyzing process. Then, the feature extracting module 220 extracts a feature amount from an image showing each of the detected images. Here, the feature amount may include various information, for example, an image showing an object itself, information on color distribution of the image, a digital image of the image, or information showing position and shape of a partial image included in the image.

Figure 5:
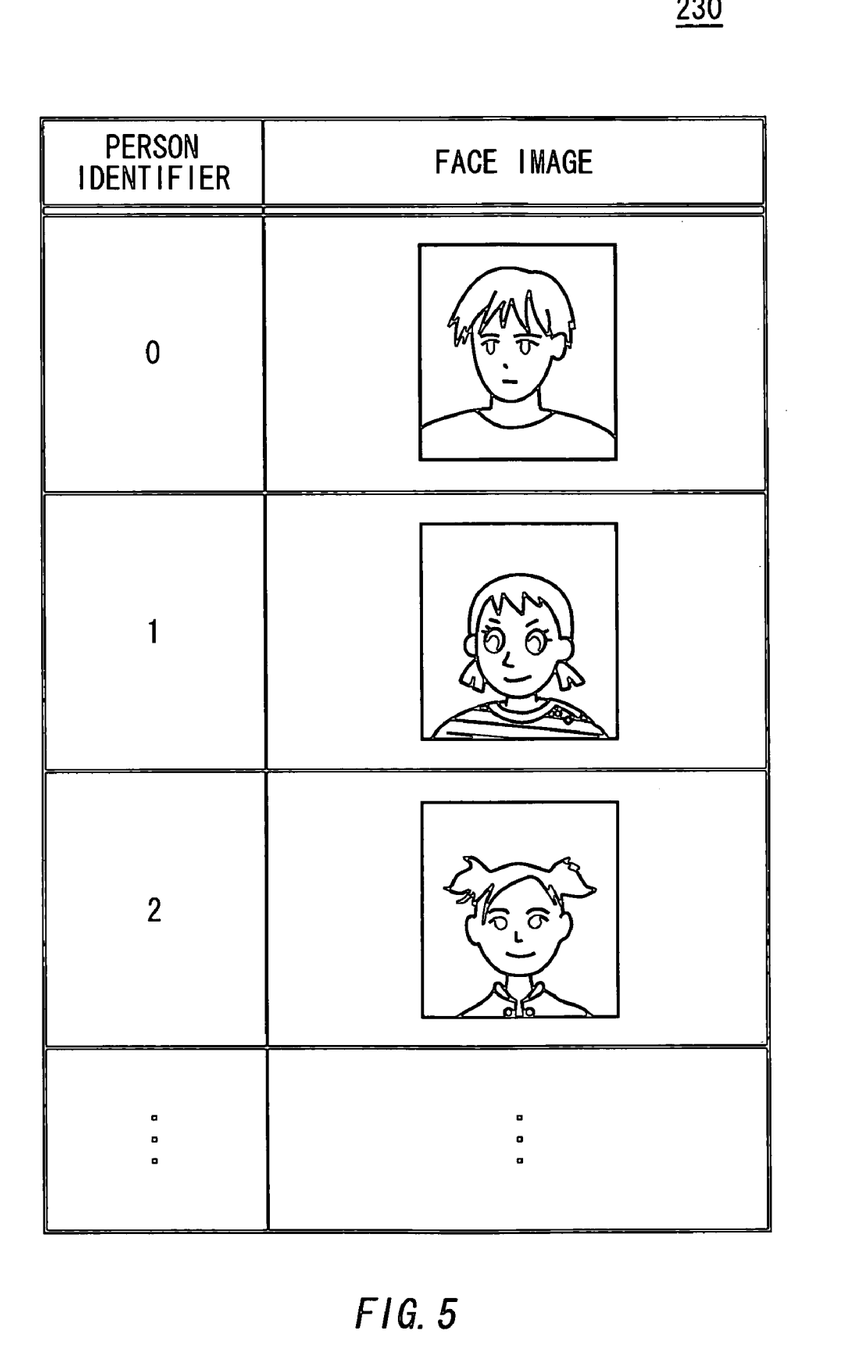
FIG. 5 shows an example of a face image database 230 according to the embodiment of the present invention.

FIG. 5 shows an example of the face image database 230 according to the embodiment of the present invention. The face image database 230 stores a person identifier for identifying each of a plurality of persons and a face image of the person so that they correspond to each other. Here, for example, the person identifier may be a value which is set to be unique for each face image when the face image is stored in the face image database 230. Further, the face image database 230 may store a feature amount extracted from a face image of a person instead of the face image. Further, the face image database 230 may receive a face image and a feature amount, which is extracted from the face image, from the person recognizing module 240 and store them. In case of recognizing persons included in an image stored in the second image storing module 210, the person recognizing module 240 may make the face image of a person extracted from the image stored in the face image database 230 as a new face image if the face image does not show correspondence with any face image stored in the face image database 230, which is larger than a predetermined reference value. By this, the face image database 230 can store a face image of a person included in at least a part of the plurality of images stored in the second image storing module 210.

Figure 6:
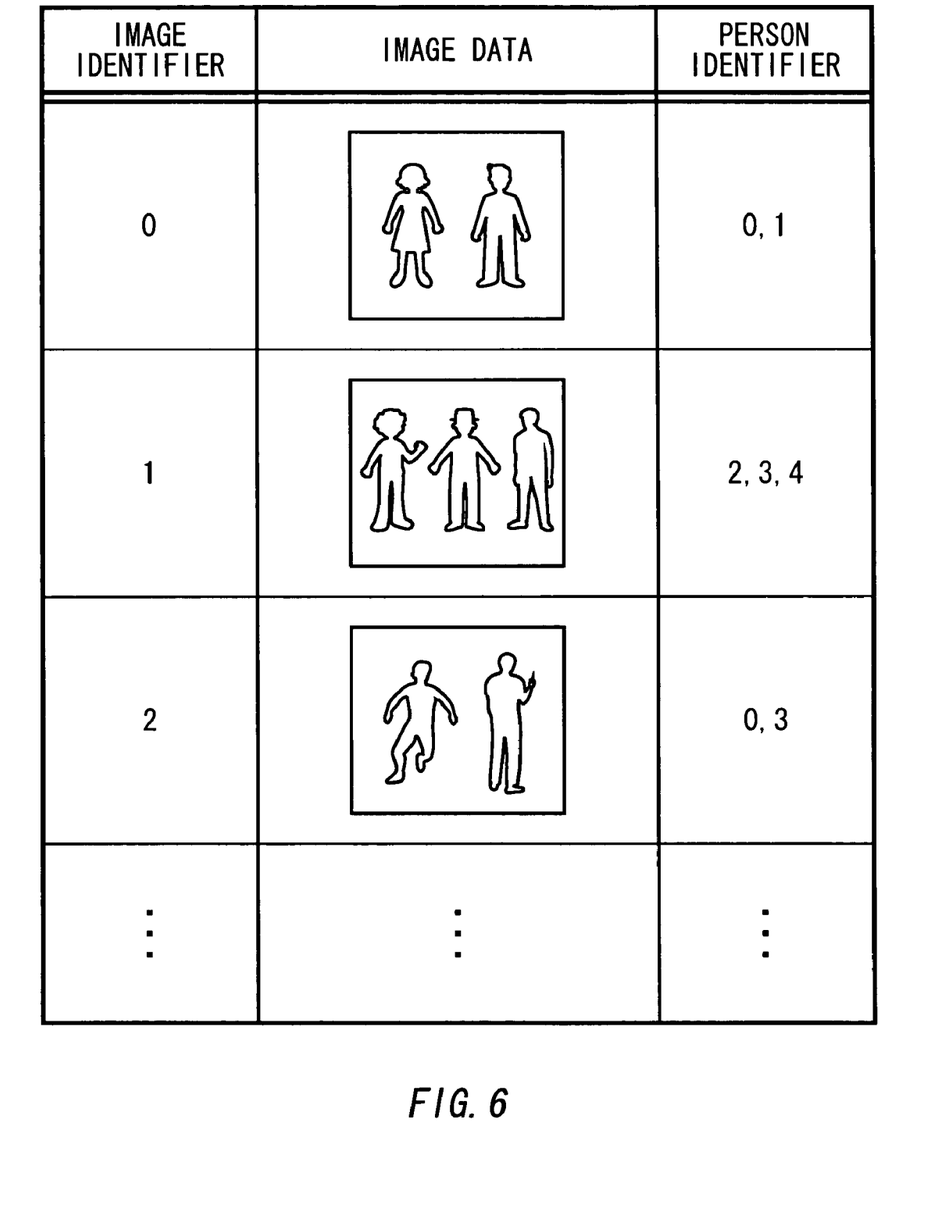
FIG. 6 shows an example of result of a person recognizing module 240 according to the embodiment of the present invention recognizing persons.

FIG. 6 shows an example of result of the person recognizing module 240 according to the embodiment of the present invention recognizing persons. For each of the plurality of images stored in the second image storing module 210, the person recognizing module 240 recognizes persons included in the image on the basis of the feature amount of every object included in the image, which is extracted by the feature extracting module 220. For example, on the basis of the extracted feature amount of each object, the person recognizing module 240 determines whether or not the object is a person, and, if the object is a person, detects a feature amount extracted from the face image of the person out of feature amounts of the object. Here, the extracted feature amount may be information, such as a contour shape of a face, a shape of a partial image showing a distinguished part of the face, such as eyes, a nose, and a mouth, a position of the distinguished part in the whole face, or a positional relationship of each part, for example. Then, the person recognizing module 240 detects a face image of which feature amount shows correspondence with the detected feature amount, which is larger than a predetermined reference value, out of the face images of the plurality of persons stored in the face image database shown in FIG. 5. Thus, the person recognizing module 240 recognizes the object to be a person corresponding to the detected face image and makes the object correspond to the person identifier of the person. As above, for each of the plurality of images, the person recognizing module 240 detects a plurality of person identifiers showing a plurality of persons included in the image as shown in FIG. 6.

Figure 7:
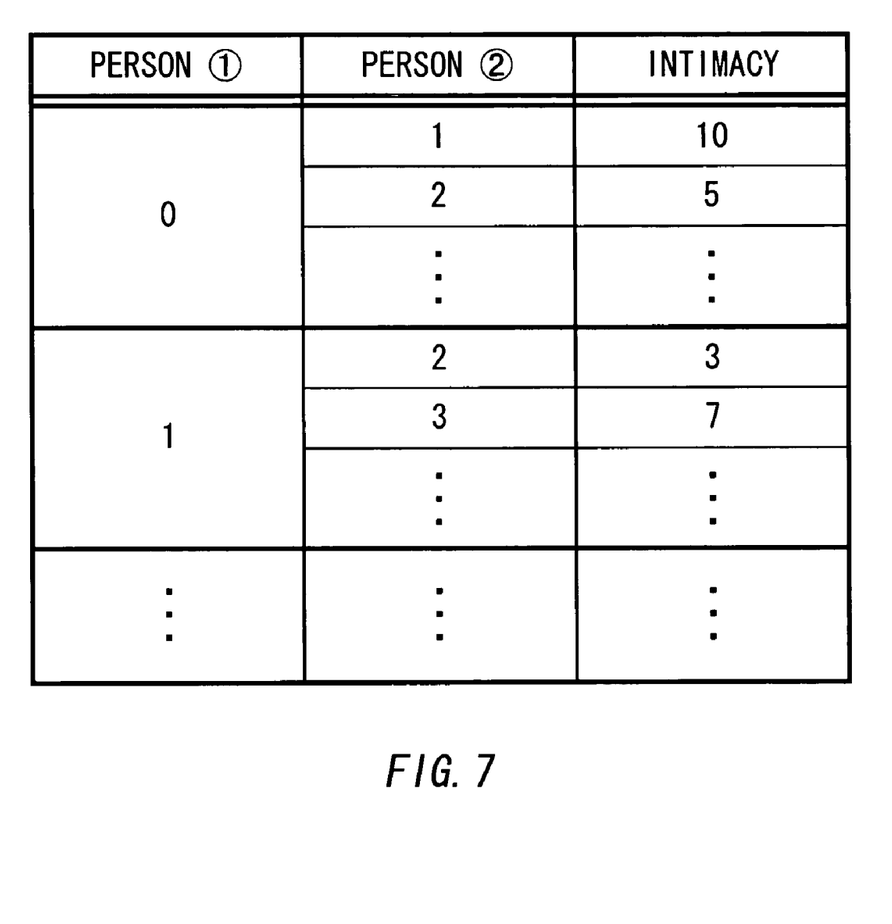
FIG. 7 shows an example of result of an intimacy evaluating module 250 according to the embodiment of the present invention evaluating intimacy.

FIG. 7 shows an example of result of the intimacy evaluating module 250 according to the embodiment of the present invention evaluating intimacy. The intimacy evaluating module 250 evaluates intimacy between each of persons included in at least a part of the plurality of images stored in the second image storing module 210. For example, the intimacy evaluating module 250 evaluates intimacy between a person whose person identifier is zero (0) and a person whose person identifier is one (1) as ten (10), as shown in the present figure. Here, as the number of images including both of a first person and a second person included in at least a part of the plurality of images stored in the second image storing module 210 is larger, the intimacy evaluating module 250 may evaluate intimacy between the first person and the second person as higher. For example, the intimacy evaluating module 250 may evaluate intimacy as the number of images including both of a first person and a second person.

Here, an image including the owner of the second electronic album has been stored in the second image storing module 210. Then, the feature selecting module 260 detects a person identifier showing the owner of the second electronic album on the basis of the image including the owner of the second electronic album and the result of the person recognizing module 240 recognizing persons included in the image. Then, the feature selecting module 260 detects a person identifier of a person in case intimacy between the person and the owner of the second electronic album is larger than a predetermined reference value on the basis of the person identifier showing the owner of the second electronic album and the result of the intimacy evaluating module 250 evaluating intimacy shown in the present figure. Then, on the basis of the result of the person recognizing module 240 recognizing every object included in each of the plurality of images stored in the second image storing module 210, the feature selecting module 260 detects an image including the person indicated by the detected person identifier as an object and the object showing the person. Then, the feature selecting module 260 outputs a feature amount of an object showing the person out of feature amounts of objects included in each of the plurality of images, which are extracted by the feature extracting module 220, to the image selecting module 130 via the second sending module 272 and the first receiving module 112. Here, in case the person is included in a plurality of images, the feature selecting module 260 may output feature amounts extracted from at least a part of the plurality of images to the image selecting module 130. Then, the image selecting module 130 selects an image including an object having a feature amount, which shows correspondence with the feature amount received from the feature selecting module 260 larger than a predetermined reference value, out of the plurality of images stored in the first image storing module 120 by using known image recognizing techniques. Then, the image transmitting module 140 retrieves the image selected by the image selecting module 130 from the first image storing module 120 and makes the image stored in the second image storing module 210.

Further, although the feature selecting module 260 detects a person identifier showing the owner of the second electronic album on the basis of the image including the owner of the second electronic album which has been stored in the second image storing module 210 in the above description, the feature selecting module 260 may detect a person identifier showing the owner of the second electronic album on the basis of a face image of the owner of the second electronic album captured by an image capturing means such as a digital camera provided in the second image storing unit 200.

According to the image transmitting system 10 of the embodiment of the present invention, it is possible to detect a person who shows high intimacy with the owner of the second electronic album from images included in the second electronic album. In many cases, the image of the person who shows high intimacy with the owner of the second electronic album is an image which the owner of the second electronic album wants to take in the second electronic album. Therefore, according to the image transmitting system 10, it is possible to select an image which the owner of the second electronic album wants to acquire with high accuracy and take the image in the second electronic album.

Figure 8:
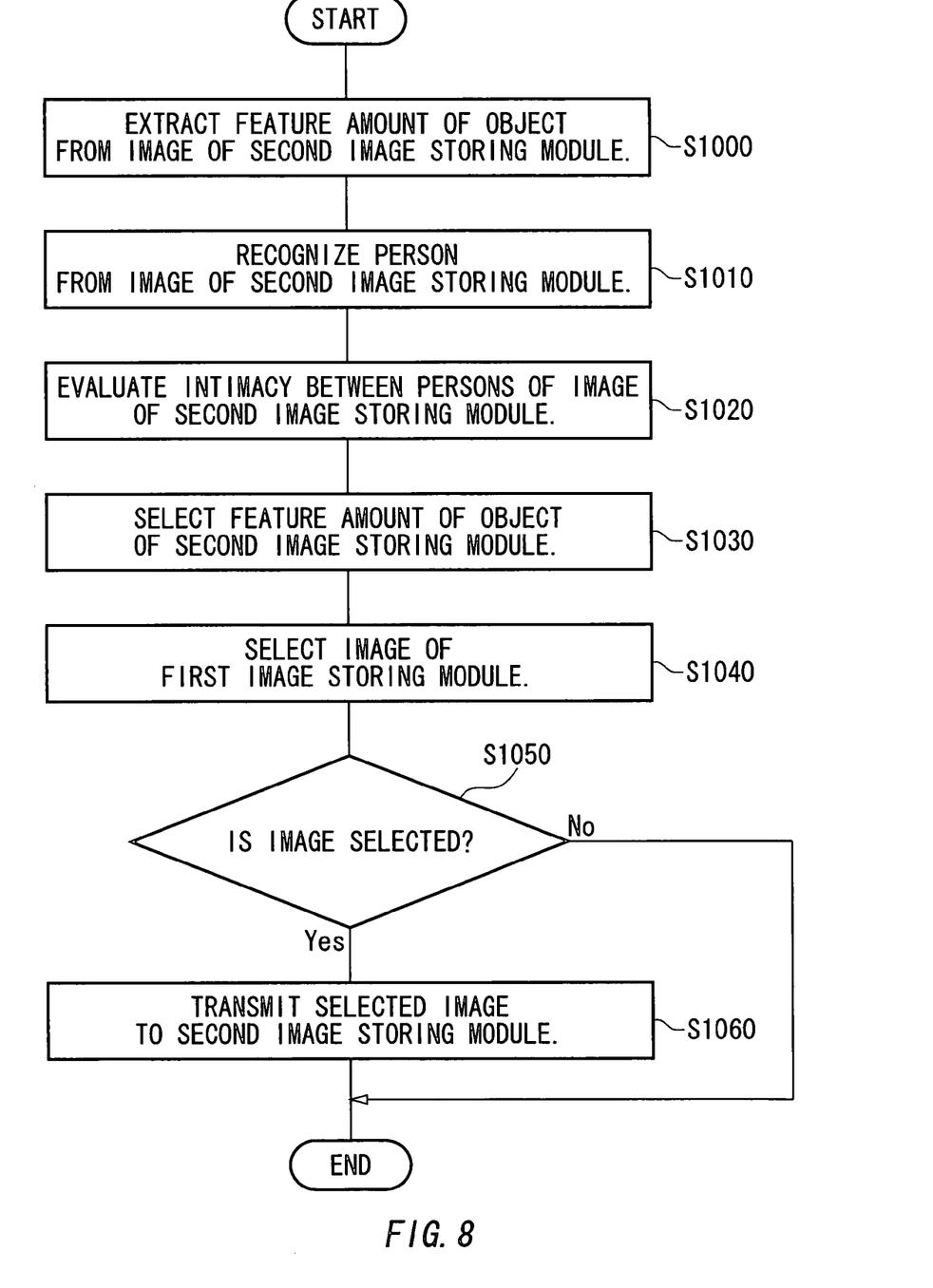
FIG. 8 is a flow chart showing an example of a process flow of the image transmitting system 10 according to the embodiment of the present invention.

FIG. 8 is a flow chart showing an example of a process flow of the image transmitting system 10 according to the embodiment of the present invention. First, the feature extracting module 220 extracts a feature amount of an object included in each of the plurality of images stored in the second image storing module 210 (S1000). Then, for each of the plurality of images stored in the second image storing module 210, the person recognizing module 240 recognizes a plurality of persons included in the image on the basis of face images of a plurality of persons included in the face image database 230 (S1000). Then, the intimacy evaluating module 250 evaluates intimacy between persons included in at least a part of the plurality of images stored in the second image storing module 210 on the basis of the result of recognizing a plurality of persons included in each of the plurality of images stored in the second image storing module 210 (S1020). Then, the feature selecting module 260 selects at least a part of feature amounts of objects extracted from each of the plurality of images stored in the second image storing module 210 (S1030). For example, the feature selecting module 260 may select a feature amount corresponding to a person showing intimacy with the owner of the second electronic album which is higher than a predetermined reference value.

Then, the image selecting module 130 selects an image including an object showing correspondence with the object included in the image stored in the second image storing module 210, which is higher than a predetermined reference value, out of the plurality of images included in the first image storing module 120 on the basis of the feature amount which is extracted by the feature extracting module 220 and selected by the feature selecting module 260 (S1040). For example, on the basis of a feature amount corresponding to a person showing intimacy with the owner of the second electronic album which is higher than a predetermined reference value, the image selecting module 130 may select an image including a person showing intimacy with the person, which is higher than a predetermined reference value, out of the plurality of images stored in the first image storing module 120. Here, the reference value for intimacy may be a value determined by the owner of the second electronic album, for example. Further, for example, on the basis of a feature amount corresponding to a person showing intimacy with the owner of the second electronic album which is within a predetermined range, the image selecting module 130 may select an image including a person showing correspondence with the person which is higher than a predetermined reference value out of the plurality of images stored in the first image storing module 120. Here, the predetermined range may be a range determined by the owner of the second electronic album, for example.

Here, the image transmitting system 10 determines whether or not any image is selected by the image selecting module 130 (S1050). Then, in case any image is selected (S1050: Yes), the image transmitting module 140 retrieves the selected image from the first image storing module 120 and transmits the image from the first image storing module 120 to the second image storing module 210 by making the image stored in the second image storing module 210 (S1060).

Further, the process of the image transmitting system 10 is not limited to that described above and various changes may be made to the above process. For example, in case an image including the owner of the second electronic album has been stored in the second image storing module 210, the image selecting module 130 may select an image including the owner of the second electronic album, specifically, an image including a person showing correspondence with the owner of the second electronic album which is higher than a predetermined reference value, out of the plurality of images stored in the first image storing module 120 on the basis of the feature amount which is received from the feature selecting module 260 and corresponds to the owner of the second electronic album. Further, here, in case an image including the owner of the first electronic album has been stored in the first image storing module 120, the image selecting module 130 may select an image including both of the owner of the first electronic album and the owner of the second electronic album, specifically, an image including both of a person showing correspondence with the owner of the first electronic album which is higher than a predetermined reference value and a person showing correspondence with the owner of the second electronic album which is higher than a predetermined reference value, out of the plurality of images stored in the first image storing module 120. Further, the image selecting module 130 may select an image by using a face image of the owner of the first electronic album captured by an image capturing means such as a digital camera provided in the first image storing unit 100 instead of the image including the owner of the first electronic album previously stored in the first image storing module 120. As above, the image transmitting system 10 can select an image which the owner of the second electronic album wants to acquire with high accuracy and transmit it.

Further, the image selecting module 130 may select an image to be transmitted on the basis of the kinds of objects included in an image stored in the second image storing module 210. Specifically, for each of the plurality of images stored in the second image storing module 210, the feature extracting module 220 extracts a feature amount of each of objects included in the image and detects the kind of the object on the basis of the extracted feature amount. Here, the kind of the object may be a kind classified on the basis an image showing the object. Specifically, the kind of the object may show a classification of things animate and inanimate such as "person", "flower", and "automobile" or a name of a certain person such as "A" and "B". In this case, for each of a plurality of kinds, the second image storing unit 200 may further include a feature amount database storing a unique feature amount of an object belonging to the kind. Further, the feature extracting module 220 may detect the kind of each object by comparing the feature amounts stored in the feature amount database with a feature amount extracted from the object.

Then, the feature selecting module 260 detects a kind to which more objects belong out of kinds to which objects included in each of the plurality of images stored in the second image storing module belong to, on the basis of the result of the feature extracting module 220 detecting the kind of each object. Then, the feature selecting module 260 outputs the feature amount of an object belonging to the detected kind to the image selecting module 130. Instead, for each kind, the feature selecting module 260 may output feature amounts of objects belonging to the kind together with the number of the objects belonging to the kind to the image selecting module 130. Further, the feature amount output by the feature selecting module 260 may be the feature amount extracted from the image stored in the second image storing module 210 or the feature amount stored in the feature amount database.

Then, the image selecting module 130 selects an image including an object belonging to the kind, to which more objects belong, of the kinds of objects included in each of the plurality of images stored in the second image storing module 210, out of the plurality of images stored in the first image storing module 120 with higher probability. Specifically, the image selecting module 130 selects an image including an object having a feature amount showing correspondence with a feature amount of an object belonging to the kind which is higher than a predetermined reference value. For example, the image selecting module 130 may select a predetermined number of kinds to which most objects belong to out of a plurality of kinds and select an image including an object belonging to each of the selected kinds. Here, the predetermined number may be a number determined by the owner of the second electronic album, for example. By this, it is possible to select an image including an object of a kind in which the owner of the second electronic album is very interested with high accuracy and transmit it.

Further, the feature extracting module 220 may extract a feature amount from each image and output to the feature selecting module 260 right before a feature amount is sent from the second image storing unit 200 to the first image storing unit 100 in order to request image transmission, or, extract a feature amount from each image to store it in the second image storing module 210 so that it corresponds to the image and retrieve the feature amount from the second image storing module 210 to output it to the feature selecting module 260 right before the feature amount is sent.

Further, on the basis of the number of images stored in the first image storing module 120, the image selecting module 130 may determine a reference value of correspondence between an object included in an image stored in the first image storing module 120 and an object included in an image stored in the second image storing module 210. Specifically, the image selecting module 130 may determine the reference value to be higher as the number of images stored in the first image storing module 120 is larger. Here, in case comparing an image stored in the first image storing module 120 and an object included in an image stored in the second image storing module 210 by using image recognizing process, the image selecting module 130 may determine a reference value to be used by increasing or decreasing a standard reference value predetermined, for example, by the owners of the first and second electronic albums on the basis of the number of images stored in the first image storing module 120, so as to determine whether or not the objects are the same with sufficiently high accuracy.

In case more images are stored in the first image storing module 120 which is a source of image transmission, if the same reference value is used as in the case less images are stored, then the number of images to be selected becomes larger and, sometimes, images of a number larger than necessary may be transmitted. However, by determining the reference value on the basis of the number of images stored in the first image storing module 120, it is possible to select images by using a higher reference value in case more images are stored and thus prevent images of a number larger than necessary from being transmitted. Further, by this, since an image including an object showing higher correspondence with an object of an image included in the second electronic album is transmitted in case more images are included in the first electronic album, it is possible to transmit an image with high relevancy to the image included in the second electronic album and carefully selected.

In the meantime, in case the number of images to be transmitted is indicated by the owners of the first and second electronic albums, the image selecting module 130 may select images of the indicated number including an object showing highest correspondence with an object included in an image stored in the second image storing module 210 as the images to be transmitted.

Figure 9:
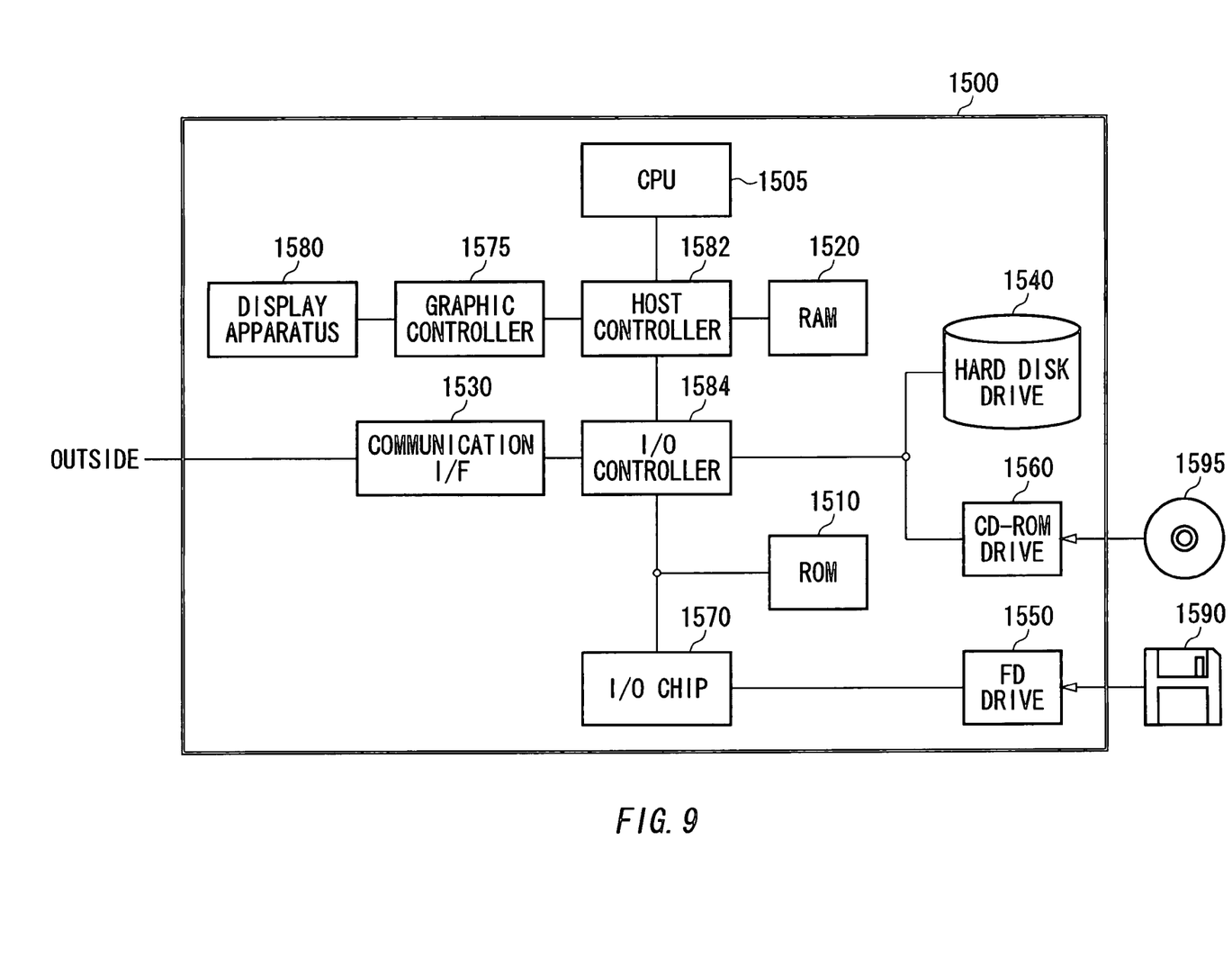
FIG. 9 is a block diagram showing an example of a hardware configuration of a computer 1500 according to the embodiment of the present invention.

FIG. 9 is a block diagram showing an example of a hardware configuration of a computer 1500 according to the embodiment of the present invention. The computer 1500 according to the embodiment of the present invention includes a CPU peripheral part comprising a CPU 1505, a RAM 1520, a graphic controller 1575, and a display apparatus 1580 which are connected with each other by a host controller 1582, an input and output part comprising a communication interface 1530 connected to the host controller 1582 by an input and output controller 1584 ("I/O controller 1584"), a hard disk drive 1540, and a CD-ROM drive 1560, and a legacy input and output part comprising a ROM 1510 connected to the I/O controller 1584, a flexible disk drive 1550, and an input and output chip 1570 ("I/O chip 1570").

The host controller 1582 connects the RAM 1520 with the CPU 1505 having access to the RAM 1520 at a high transmission rate and the graphic controller 1575. The CPU 1505 operates and performs control of each part on the basis of programs stored in the ROM 1510 and the RAM 1520. The graphic controller 1575 acquires image data which is generated on a frame buffer provided in the RAM 1520 by the CPU 1505, etc. and displays it on the display apparatus 1580. Instead, the graphic controller 1575 may include a frame buffer storing an image data generated by the CPU 1505, etc. therein.

The I/O controller 1584 connects the host controller 1582 with the communication interface 1530, which is a relatively high-speed I/O apparatus, the hard disk drive 1540, and the CD-ROM drive 1560. The communication interface 1530 communicates with another apparatus via a network. The hard disk drive 1540 stores a program and data used by the CPU 1505 in the computer 1500. The CD-ROM drive 1560 retrieves a program or data from a CD-ROM 1595 and provides the hard disk drive 1540 with it via the RAM 1520.

Further, the I/O controller 1584 is connected with the ROM 1510 and a relatively low-speed I/O apparatus such as the flexible disk drive 1550 and the I/O chip 1570. The ROM 1510 stores a program executed by the CPU 1500 when the computer 1500 starts to operate, a program depending on the hardware of the computer 1500, and the like. The flexible disk drive 1550 retrieves a program or data from a flexible disk 1590 and provides the hard disk drive 1540 with it via the RAM 1520. The I/O chip 1570 connects the flexible disk drive 1550 with various I/O apparatus via a parallel port, a serial port, a keyboard port, a mouse port, and the like.

An image transmitting program provided to the hard disk drive 1540 via the RAM 1520 is stored in a recording medium such as the flexible disk 1590, the CD-ROM 1595, or an IC-card and provided by a user. The image transmitting program is retrieved from the recording medium, installed on the hard disk drive 1540 in the computer 1500 via the RAM 1520, and executed on the CPU 1505. The image transmitting program installed and executed on the computer 1500 makes the CPU 1505 and the like operate and the computer 1500 function as the image transmitting system 10, the first image storing unit 100, or the second image storing unit 200.

The program described above may be stored in a recording medium of the outside. An optical recoding medium such as a DVD, a PD, etc., a magneto-optical recording medium such as an MD, a tape medium, and a semiconductor memory such as an IC card can be used as the recoding medium in addition to the flexible disk 1590 and the CD-ROM 1595. Further, a storing apparatus such as a hard disk or a RAM provided in a server system connected with a dedicated communication network and internet may be used as the recording medium and may provide the computer 1500 with the program through the network.

Although the present invention has been described by way of exemplary embodiments, it should be understood that those skilled in the art might make many changes and substitutions without departing from the spirit and the scope of the present invention which is defined only by the appended claims.

What is claimed is:

1. An electronic image album creating system for editing a second electronic image album with reference to a first electronic image album comprising:

a first image storing module storing a plurality of images in the first electronic image album;

a second image storing module storing a plurality of images in the second electronic image album;

a feature extracting module for extracting a feature amount of an object included in each of the plurality of images stored in said second image storing module;

an image selecting module for selecting an image out of the plurality of images stored in said first image storing module on the basis of the feature amount extracted by said feature extracting module, the selected image including an object having a feature amount the similarity of which to that of the object included in the image stored in said second image storing module is higher than a predetermined reference value; and an image transmitting module for retrieving the image selected by said image selecting module from said first image storing module and storing the image in said second image storing module as a result of the transmission of the image retrieved from said first image storing module to said second image storing module.

2. The electronic image album creating system as claimed in claim 1, wherein an image including the owner of the second electronic image album has been stored in said second image storing module, and said image selecting module selects an image including the owner of the second electronic image album out of the plurality of images stored in said first image storing module.

3. The electronic image album creating system as claimed in claim 2, wherein an image including the owner of the first electronic image album has been stored in said first image storing module, and said image selecting module selects an image including both of the owners of the first and second electronic image albums out of the plurality of images stored in said first image storing module.

4. The electronic image album creating system as claimed in claim 1, wherein, out of kinds of objects included in each of the plurality of images stored in said second image storing module, said image selecting module selects an image including an object of a kind to which more objects belong than another kind out of the plurality of images stored in said first image storing module with high probability.

5. The electronic image album creating system as claimed in claim 1, wherein said image selecting module determines the reference value for correspondence between an object included in an image stored in said first image storing module and an object included in an image stored in said second image storing module on the basis of the number of images stored in the first image storing module.

6. The electronic image album creating system as claimed in claim 1, further comprising:

a person recognizing module for recognizing a plurality of persons included in each of the plurality of images stored in said second image storing module; and an intimacy evaluating module for evaluating intimacy between persons included in at least a part of the plurality of images stored in said second image storing module on the basis of the recognition result of said person recognizing module, wherein an image including the owner of the second electronic image album has been stored in said second image storing module, and said image selecting module selects an image including a person showing correspondence with a person showing intimacy with the owner of the second electronic image album higher than a predetermined reference value, the correspondence being higher than another predetermined reference value, out of the plurality of images stored in said first image storing module.

7. A method for creating an electronic image album by editing a second electronic image album with reference to a first electronic image album, wherein a first image storing module stores a plurality of images in the first electronic image album, a second image storing module stores a plurality of images in the second electronic image album, and the method comprises:

a feature extracting step of extracting a feature amount of an object included in each of the plurality of images stored in said second image storing module;

an image selecting step of selecting an image out of the plurality of images stored in said first image storing module on the basis of the feature amount extracted in said feature extracting step, the selected image including an object having a feature amount the similarity of which to that of the object included in the image stored in said second image storing module is higher than a predetermined reference value; and an image transmitting step of retrieving the image selected in said image selecting step from said first image storing module and storing the image in said second image storing module as a result of the transmission of the image retrieved from said first image storing module to said second image storing module.

8. A machine readable medium storing thereon a computer program for making a computer function as an electronic image album creating system for editing a second electronic image album with reference to a first electronic image album, the computer comprising:

a first image storing module storing a plurality of images in a first electronic image album;

a second image storing module storing a plurality of images in a second electronic image album;

a feature extracting module for extracting a feature amount of an object included in each of the plurality of images stored in said second image storing module;

an image selecting module for selecting an image out of the plurality of images stored in said first image storing module on the basis of the feature amount extracted by said feature extracting module, the selected image including an object having a feature amount the similarity of which to that of the object included in the image stored in said second image storing module is higher than a predetermined reference value; and an image transmitting module for retrieving the image selected by said image selecting module from said first image storing module and storing the image in said second image storing module as a result of the transmission of the image retrieved from said first image storing module to said second image storing module.

9. The electronic image album editing system as claimed in claim 6, wherein said intimacy evaluating module evaluates the intimacy between a first person and a second person as higher, when the number of images including both of the first person and the second person included in at least a part of the plurality of images stored in said second image storing module is larger.

10. The electronic image album editing system as claimed in claim 9, wherein said intimacy evaluating module evaluates the intimacy as the number of images including both of the first person and the second person.

11. The electronic image album editing system as claimed in claim 6, further comprising a feature selecting module that detects a person identifier identifying the owner of the second electronic album on the basis of the image including the owner of the second electronic album and the result of recognizing persons included in the image recognized by said person recognizing module, and the feature selecting module detects a person identifier of a person whose intimacy with respect to the owner of the second electronic album is larger than a predetermined reference value on the basis of the person identifier identifying the owner of the second electronic album and the result of evaluating intimacy evaluated by said intimacy evaluating module.

* * * * *